United States Patent Office.

A. D. SCHLESINGER, OF COLLEGE POINT, LONG ISLAND, NEW YORK, ASSIGNOR TO THE INDIA-RUBBER COMB COMPANY.

Letters Patent No. 99,956, dated February 15, 1870.

IMPROVEMENT IN COLORING VULCANITE OR HARD RUBBER.

The Schedule referred to in these Letters Patent and making part of the same.

*To all whom it may concern:*

Be it known that I, A. D. SCHLESINGER, of College Point, Long Island, in the State of New York, have invented a new and useful Improvement in the Process of Coloring what is known as Vulcanite or Hard Rubber; and I do hereby declare that the following is a full, clear, and exact description thereof.

It has been deemed important in the preparation of vulcanite or hard rubber for dental plates and other uses to obtain it of a light red color, and until very lately the required color could only be obtained by the use of vermilion, which is a sulphuret of mercury, and by many believed to be deleterious when in the mouth and under the influence of the saliva, even when incorporated with the vulcanite; and when the colored vulcanite was for other purposes than dental plates, the cost of vermilion or the deep red of the oxide was a serious objection to its use. Latterly, but prior to my said invention, a substitute for vermilion was discovered which is not deleterious and which is cheaper, which substitute consists of oxide of antimony colored with a preparation of garancine and cochineal; but I have since discovered that the oxide of antimony alone, which is white, when thoroughly mixed with India rubber or allied gum and sulphur, will, when subjected to the vulcanizing process, impart to the whole mass a light red color very similar to that attained by the use of vermilion, as well as by the oxide of antimony colored with the preparation of garancine and cochineal.

The mode of preparation which I have practiced with success is to mix the oxide of antimony with the India rubber (or allied gum) and sulphur just as the gum and sulphur have heretofore been mixed, by grinding between rollers sufficiently heated to soften the gum.

The sulphur and gum are mixed in any of the proportions heretofore practiced for making vulcanite, and to each pound of gum add twelve ounces of oxide of antimony; but the relative proportions may be varied without materially changing the result.

After these ingredients have been thoroughly incorporated, the compound is ready to be vulcanized in the usual way by heat.

If required for dental plates, the compound is rolled into sheets, ready to be molded by the dentists, and vulcanized as heretofore when using the compound of India rubber and vermilion.

What I claim as my invention, and desire to secure by Letters Patent, is—

The compound of India rubber, sulphur, and oxide of antimony, prepared substantially as described, and ready to be vulcanized by heat, as set forth.

Also, the process, substantially as described, for producing vulcanite of a light red or vermilion color, which process consists in thoroughly mixing India rubber, (or allied gum,) sulphur, and oxide of antimony, and subjecting the said compound to a vulcanizing heat, substantially as described, and for the purpose set forth.

A. D. SCHLESINGER.

Witnesses:
SOLOMON F. HIGGINS,
E. C. REEHILL.